May 9, 1933. K. B. ANGELL 1,908,278
PACKAGE FOR FISH LINES AND THE LIKE
Filed Aug. 11, 1931
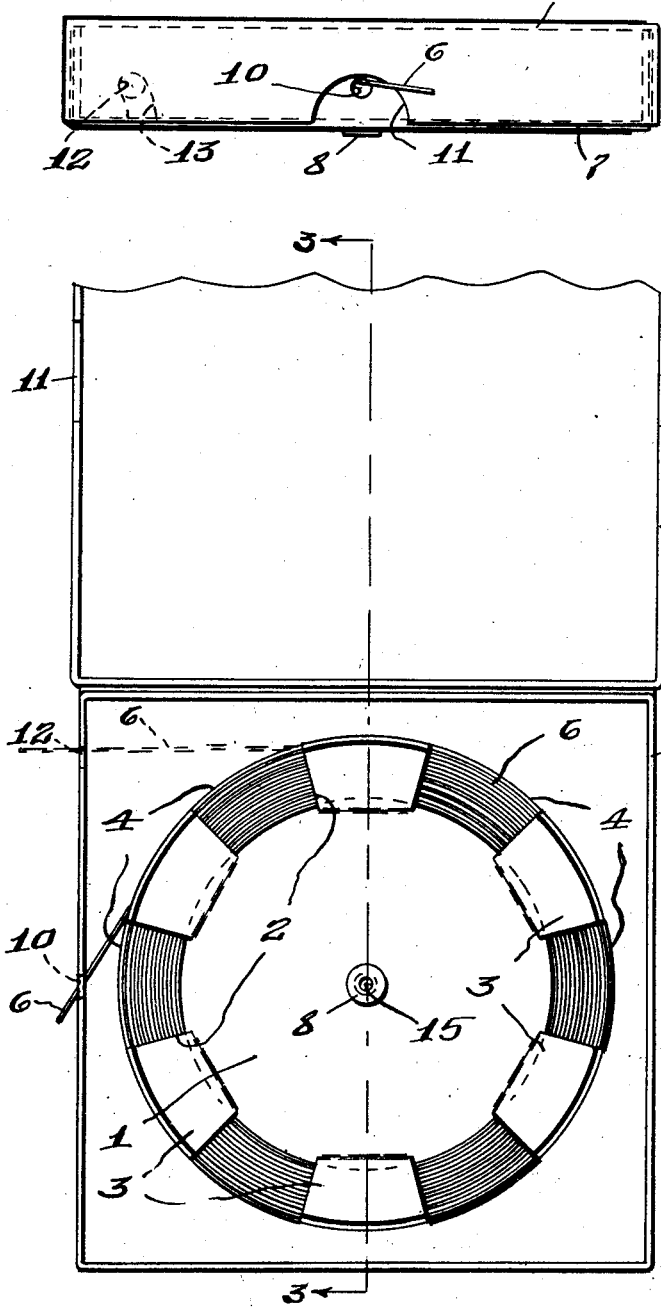
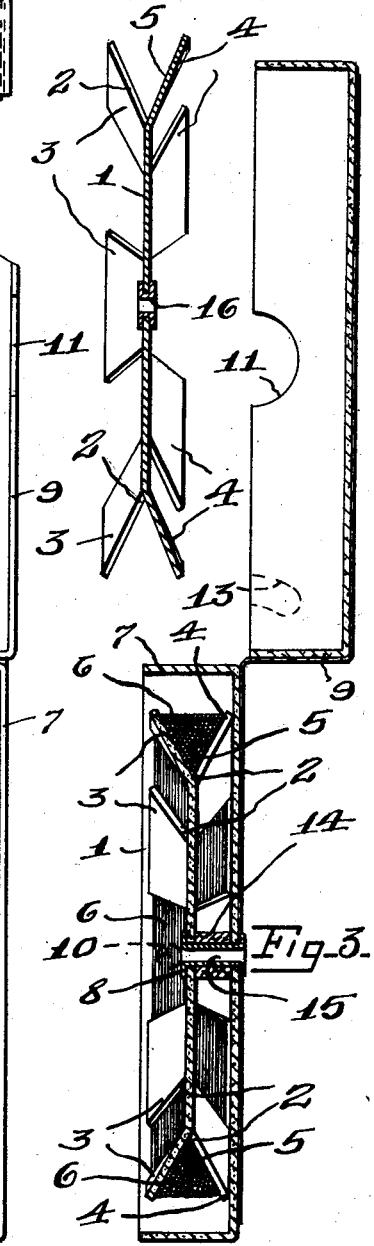
INVENTOR.
Keith Brown Angell
BY
Prodell & Thompson
ATTORNEYS.

Patented May 9, 1933

1,908,278

UNITED STATES PATENT OFFICE

KEITH BROWN ANGELL, OF SOUTH OTSELIC, NEW YORK, ASSIGNOR TO B. F. GLADDING & CO., INC., OF SOUTH OTSELIC, NEW YORK, A CORPORATION OF NEW YORK

PACKAGE FOR FISH LINES AND THE LIKE

Application filed August 11, 1931. Serial No. 556,422.

This invention relates to packages for fish lines and the like and has for its object a package comprising a reel from which the line can be readily unwound for the purpose of winding it onto the reel on the fish pole and, if desired, replaced in the package after being used. The package is particularly simple and extremely economical in manufacture, attractive in appearance and highly efficient in use.

The invention consists in the novel features and in the combinations and constructions hereinafter set forth and claimed.

In describing this invention reference is had to the accompanying drawing in which like characters designate corresponding parts in all the views.

Figure 1 is a side elevation of this package or container.

Figure 2 is a fragmentary plan view of parts seen in Figure 1, the box being shown as open.

Figure 3 is a sectional view on line 3—3, Figure 2.

Figure 4 is a view similar to Figure 3, showing the package when no box is used.

This package comprises a reel having a discoidal body with opposite series of radially extending marginal tongues, the tongues of one series alternating with those of the other and adjacent tongues extending or being displaced in opposite directions out of the plane of the body of the disk and thereby forming a groove between the opposing series of tongues to receive the fish line, and a box to the bottom of which the reel is rotatably mounted, although in some instances, the box is dispensed with.

1 designates the reel which is preferably made up of cardboard or other cheap light material, this being a disk formed with radially extending marginal slits 2, which form tongues 3, 4. The tongues 3, 4 are deflected outwardly in opposite directions out of the plane of the body of the disk thereby forming a groove 5 for receiving the fish line 6, the walls of the groove being interrupted or formed with openings because of the alternate arrangement of the tongues 3 and 4, so that the fish line is displayed through the slots or openings between the tongues. Although when the reel is rotatably mounted on the bottom of the box, the line is displayed when the box is open, only through the openings in the uppermost wall of the groove.

The reel is preferably mounted on the bottom of the shallow box 7 as by a hollow rivet 8 and is either rotatable about the rivet or the rivet is rotatable relatively to the bottom of the box. The box has a suitable movable cover 9 hinged or otherwise applied thereto, the cover being of the type having marginal flanges which fit over the side walls of the box. One of the side walls of the box is provided with an opening 10 through which the end of the line extends and this opening is usually located in line with one of the finger cut-outs 11 in the side walls of the cover of the box for facilitating the opening of the cover. However, an opening as 12 may be provided in the wall of the box and a complemental slot 13 provided in the cover, said opening 12 being located so that the line will pull tangentially relatively to the reel.

Although the tongues 4 would not be deflected out of the plane of the disk 1 if the disk 1 is arranged to lie comparatively close to the bottom of the box, nevertheless in winding the line thereon, the tongues 4 may deflect out of the plane of the disk in a direction opposite to that of the tongues 3 and if so, the body of the disk 1 may flex or dish to compensate for the deflection of the tongues. Preferably spacing means is provided between the reel and the bottom of the box, this being usually a sleeve 14 around the rivet. The passage 15 of the rivet 8 may be used to receive a tool improvided or special for turning the reel to wind the line back on the reel after being used.

In Fig. 4, the reel is shown as a package for the line when no box is used and is provided with a hollow eye or hub 16 for securing a pin or axle used when rewinding the line on the reel.

This reel is particularly simple and economical in construction and owing to the spaces between the tongues 3 and the tongues 4, the line is visible when on display, and also the line can be readily removed by the purchaser and wound on the reel of a fish pole and also can be replaced and kept in the package when not in use.

What I claim:

As a new article of manufacture, a package for fish lines and the like comprising a discoidal reel formed with marginal tongues arranged in circumferential series, adjacent tongues extending laterally out of the plane of the body of the disk forming a groove for receiving a line and a flat shallow box enclosing the reel with the reel lying flatwise on the bottom of the box, the reel being rotatably mounted on the bottom of the box, said box having a movable cover and a perforation in one of its side walls through which the line extends.

In testimony whereof, I have hereunto signed my name, at South Otselic, in the county of Chenango and State of New York, this 29th day of July, 1931.

KEITH BROWN ANGELL.